No. 756,895. PATENTED APR. 12, 1904.
S. O. RICHARDSON, Jr.
PROCESS OF MANUFACTURING GLASS ARTICLES.
APPLICATION FILED DEC. 19, 1903.
NO MODEL. 3 SHEETS—SHEET 1.
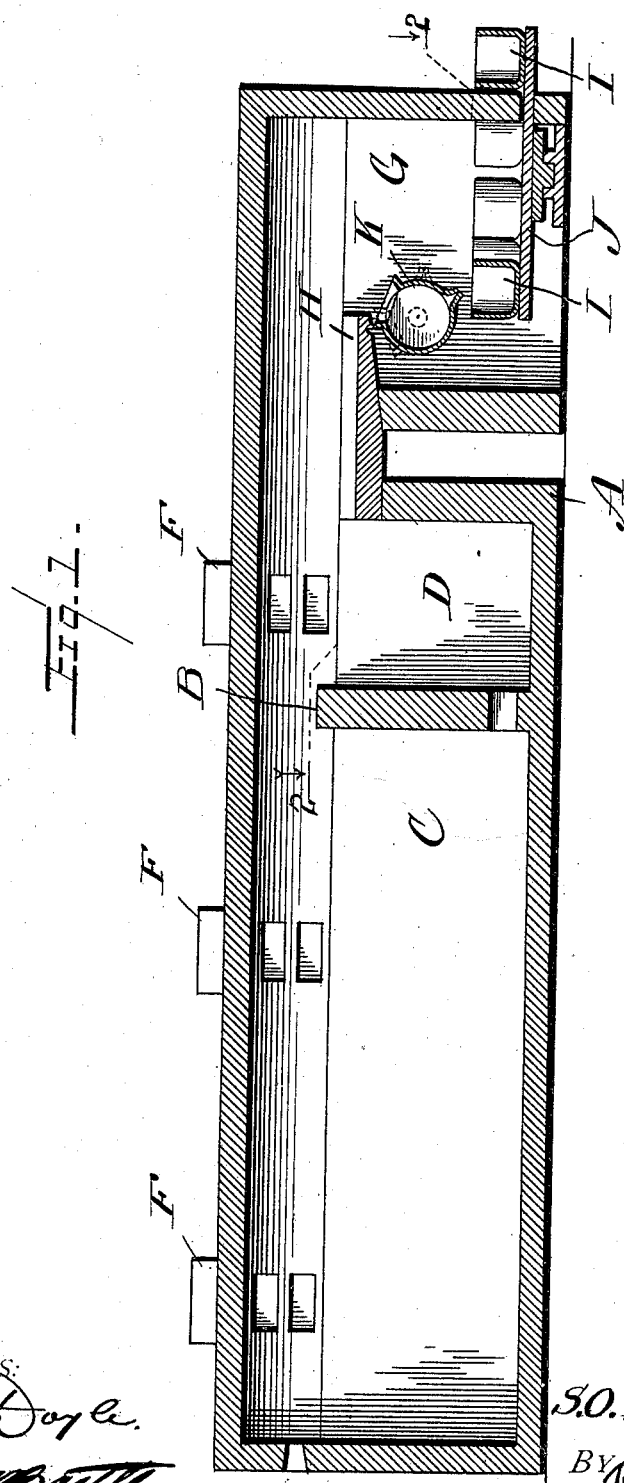
WITNESSES:
INVENTOR
S.O. Richardson, Jr.
BY
Attorneys No. 756,895. PATENTED APR. 12, 1904.
S. O. RICHARDSON, Jr.
PROCESS OF MANUFACTURING GLASS ARTICLES.
APPLICATION FILED DEC. 19, 1903.
NO MODEL. 3 SHEETS—SHEET 2.
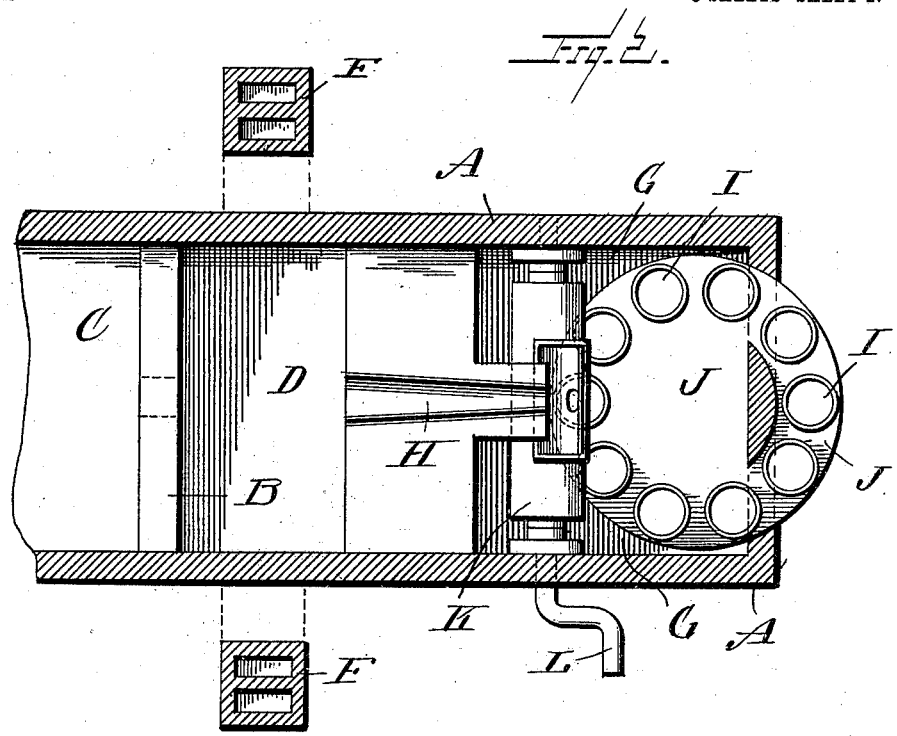
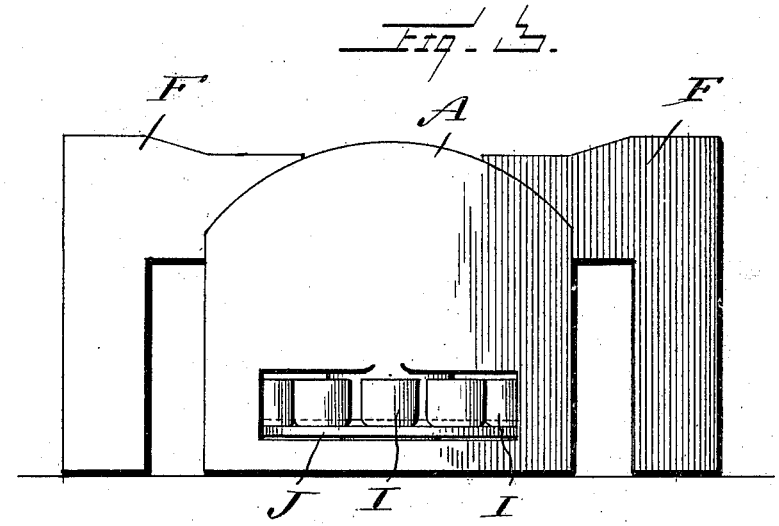
WITNESSES:
INVENTOR
S. O. Richardson, Jr.
By Raymond H. Hewett
Attorneys No. 756,895. PATENTED APR. 12, 1904.
S. O. RICHARDSON, Jr.
PROCESS OF MANUFACTURING GLASS ARTICLES.
APPLICATION FILED DEC. 19, 1903.
NO MODEL. 3 SHEETS—SHEET 3.
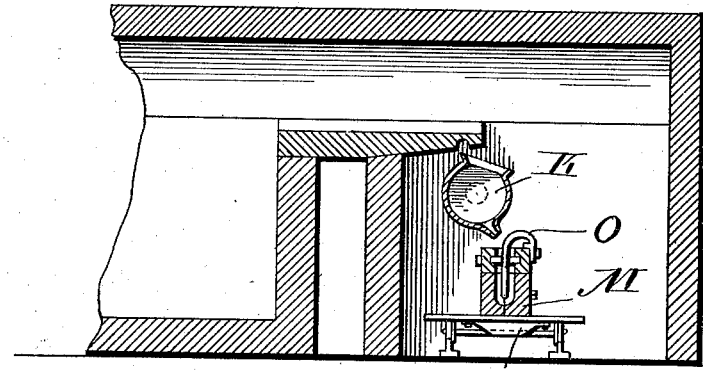
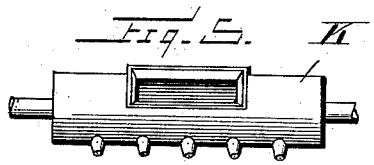
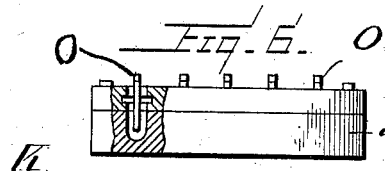
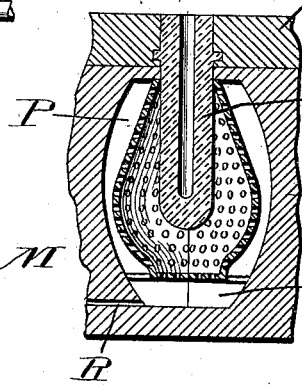
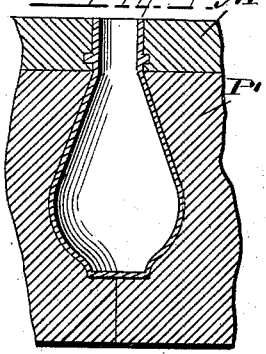
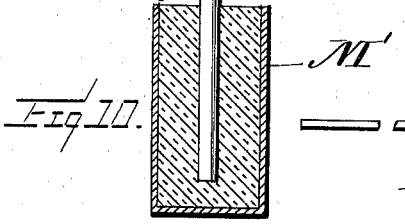
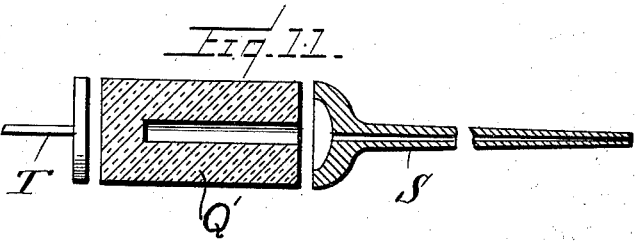
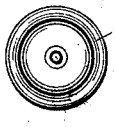
WITNESSES: INVENTOR
S. O. Richardson, Jr.
BY
Attorneys No. 756,895.    Patented April 12, 1904.

UNITED STATES PATENT OFFICE.

SOLON O. RICHARDSON, JR., OF TOLEDO, OHIO.

PROCESS OF MANUFACTURING GLASS ARTICLES.

SPECIFICATION forming part of Letters Patent No. 756,895, dated April 12, 1904.

Application filed December 19, 1903. Serial No. 185,804. (No specimens.)

*To all whom it may concern:*

Be it known that I, SOLON O. RICHARDSON, Jr., a citizen of the United States, residing at Toledo, in the county of Lucas and State of Ohio, have invented certain new and useful Improvements in Processes of Manufacturing Glass Articles, of which the following is a specification.

My invention relates to improvements in the art of manufacturing glass articles. In this art as at present practiced the batch is reduced and fined in various manners, either in tanks or in pots, as the requirement of the factory may necessitate; but in all these various forms or methods of manufacturing glass articles the reduced and refined glass is gathered from the tanks or pots and is commonly gathered by means of a gathering-rod which is inserted in the molten metal when the metal has been cooled to a proper working consistency. By skilful manipulation the required amount of glass is gathered upon the end of the rod, the rod is withdrawn and held over a mold, and as the main body of the glass so gathered falls or settles in the mold the thin stem of plastic glass extending from the glass in the mold to the rod is severed, commonly by means of a pair of shears. Such is the nature of glass, however, that starting with glass at a proper consistency for gathering it so quickly cools to a plastic state that even with skilled manipulation the line at which the glass is severed from the rod will leave a mark commonly called a "shear." If the shearing is unskilfully done, the resulting mark or blemish will decidedly mar the finished product and affect its commercial value. Skilled operators, however, are able to so make this shear that the scar resulting therefrom will be less conspicuous; but so far it has been found impossible to eliminate this objectionable feature.

The main object of my invention is to provide a process for manufacturing glass articles in such a manner that the services of the skilled gatherer and the skilled shearer, both of whom are high-priced workmen, may be dispensed with, while at the same time a more perfect product will result. This and such other advantages as may hereinafter appear are attained by my improved process, which may be conveniently practiced by the use of the apparatus shown in the accompanying drawings, in which—

Figure 1 is a sectional view of a furnace arranged for the practice of my process. Fig. 2 is a plan sectional view thereof. Fig. 3 is an end elevation thereof. Fig. 4 shows a modified form of my apparatus. Fig. 5 is a detail of a modified form of the pouring-ladle. Fig. 6 is a detail of a sectional mold. Fig. 7 is an end elevation of the mold shown in Fig. 6. Fig. 8 is a sectional detail of a finishing-mold operated by induced air-pressure. Fig. 9 is a view of a similar mold operated by direct air-pressure. Fig. 10 is a detail of a modified casting-mold. Fig. 11 shows details in the manufacture of glass tubing, and Fig. 12 is a view of the under face of a special form of blowpipe.

Like letters of reference indicate the same parts in the several figures of the drawings.

Referring by letter to the accompanying drawings, A represents the walls of a familiar form of glass-furnace. The interior of the furnace proper is divided by a bridge-wall B into the reducing tank or compartment and the refining or working chamber, communication between the two chambers being had by means of a small port in the lower part of the bridge-wall B. The glass in the reducing-chamber C is reduced and kept in a molten condition in any suitable manner, as by means of the regenerators F F of a familiar type, which are provided with air and gas ports. So, also, the reduced batch is kept in a sufficiently fluid condition in the working chamber in like manner. Under the same arch or crown with the reducing and working chamber is a casting-chamber G. The casting-chamber G, the working chamber D, and reducing-chamber C may all be in communication with each other above the metal line in the tank or furnace, so as to be heated by common means.

In the foregoing description the features of the furnace construction have been set forth in but little more than diagrammatic form, because the furnace structure *per se*, aside from the casting-chamber, is old. Leading from the working chamber to the casting-chamber is a spout arranged at such an elevation that when the molten metal within the working chamber approaches the metal line of the working chamber the metal will flow through the spout H into the casting-chamber G and will continue to so flow as long as the supply of metal in the working chamber is replenished.

The casting-chamber G is preferably closed, except for a limited opening below the metal-line of the furnace for the admission of the molds I. These molds I may be conveniently mounted upon a rotating table J, so that as the table rotates filled molds may be removed and empty molds carried into the casting-chamber.

Pivotally mounted within the casting-chamber G is a ladle K, preferably of cylindrical form. This ladle K is provided with an enlarged opening on its upper side adjacent to and below the end of the spout H and with a reduced spout on its lower side in such a position as to direct the flow of metal into the molds when the molds are moved to casting position. This ladle K may be operated by means of a lever L, extending to the outside of the furnace.

Preferably the enlarged opening in the upper face of the ladle K is of such dimensions that glass will continue to flow into the ladle when the ladle is tipped to casting position as well as when the ladle is lifted to the position shown in dotted lines in Fig. 1.

The operation of the apparatus when so constructed is as follows: When the working chamber of the furnace is filled with molten metal, the metal begins to flow through the spout H and into the ladle K, which then occupies the position shown in dotted lines in Fig. 1, so that the ladle will receive a considerable amount of metal before the metal will begin to flow out of the ladle-spout. Inasmuch as the casting-chamber is highly heated by reason of its closed construction and its direct communication with the rest of the furnace, the flow of the metal into the ladle K will not tend materially, if at all, to thicken or harden the glass, but the glass will remain in a perfectly fluid condition in the ladle K. The molds 1 being now brought successively under the ladle K, the ladle is tipped by means of the lever L, and the metal will flow from the spout H into the ladle K and from the ladle K through the ladle-spout into the molds until the required amount of glass has been admitted to the molds. This can be accurately determined through any familiar and satisfactory form of opening in the chamber G. Whenever the required amount of metal has flowed into a mold, the ladle K is again lifted to the position shown in dotted lines and receives the metal which flows out of the spout H until the next mold comes into casting position, whereupon the ladle is again tipped, the mold filled, and so on continuously. It will thus be seen that I avoid the use of the gathering-iron and eliminate entirely the skill of the gatherer as to the manipulation of the iron and as to the amount of glass to be gathered upon the iron for a given purpose. I also am enabled to keep the glass in a more fluid condition as it enters the mold, and I eliminate entirely the shearer and the trouble which arises from the shear which appears upon pressed glass as now made.

While it might be possible with some of the simplest forms, such as insulators and the like, to form a completed article in the manner above described, the nature of glass is such that it is practically impossible to make satisfactory finished articles in this manner. For this reason my process does not contemplate the completion of the glass article in this manner; but having placed in the mold the required amount of glass without the use of a gatherer, without the use of a shearer, free from shear, and in a much more fluid or plastic condition than when gathered with an iron, I remove my mold from the casting-chamber and then proceed to finish the glass article either by pressing it in the mold by means of a plunger or by blowing it either in or out of the mold in any of the numerous familiar manners whether operated by hand or by machinery. I thus may in the first steps of my process merely use my process for conveniently eliminating the gatherer and shearer, or I may so use it that the mold will give partial form to the glass, thereby providing a blank which may be then blown or otherwise manipulated to finished form. My process therefore consists in causing refined glass to flow from the fining or working tank into a mold within a heated casting-chamber, in then finishing the article by blowing it or pressing it after it has been so gathered.

In Fig. 4 I have shown a modification of the foregoing apparatus in which in place of the revolving table J, I provide a truck N, which carries a sectional mold M. A preferred form of this mold is shown in elevation and partly in section in Fig. 6. Such a mold is so formed that the upper half may be removed from the lower half thereof and is again divided longitudinally, as shown in the end elevation in Fig. 7. This mold contains a plurality of compartments, each of which is provided with a core O. With this form of mold the pivoted ladle K' may be conveniently made, as shown in Fig. 5, with a plurality of spouts arranged so that each spout will discharge into a corresponding compartment of the mold M. With this arrangement the truck N, carrying the mold, will be wheeled into place, as shown in Fig. 4, the ladle tipped to pouring position, and all of the compartments simultaneously supplied with the requisite quantity of metal. The truck is then wheeled out of the casting-chamber, the cores O are removed, the upper half of the mold M is lifted from the lower half, and is fitted upon an interchangeable mold P, a section of which is shown in Fig. 8.

Where a small article is to be made, I find that the use of a core in the mold is not always satisfactory for the reason that sometimes the glass does not freely fill in around the core. Accordingly when articles of small size are being made I omit the use of the core O. When operating in this manner, the molds containing a sufficient quantity of metal are wheeled under a suitable press of familiar form and provided with a plurality of plungers, so that one plunger is pressed into the metal within each compartment of the mold, thereby bringing up the blank to the required shape. Either method results in producing a mold-blank Q, suspended from the upper half of the mold M and into the lower half of the interchangeable mold P.

As shown in the drawings, the interchangeable mold P is shaped to form a lantern-globe, is surrounded by an air-chamber $p$, from which perforations communicate with the interior of the mold and from which an exhaust-port R leads to suitable means for exhausting the air from the interior of the mold, whereupon atmospheric pressure will expand the blank Q evenly within the mold, so as to form a globe, in the manner shown in Fig. 9.

As soon as the glass has sufficiently cooled the molds are separated from the globe and the globe so formed is ready for annealing in the usual manner.

In Fig. 10 I have shown a mold M' of simpler form than the mold M. This mold is also provided with a core and forms a blank Q', as shown in Fig. 11, adapted for use in the manufacture of window-glass or tubing. The core being withdrawn, this blank may be withdrawn from the mold by means of a suitably-formed blowpipe S, having an annular face, which when heated will adhere to the plastic metal within the mold. The glass may be then swung and blown in the usual manner, as for window-glass, or a drawing-tube T may be heated and attached to the opposite end of the blank and the blank then blown and drawn into glass tubing in the usual manner.

The foregoing serve merely as typical examples of some of the numerous ways in which my process may be utilized to facilitate and perfect the manufacture of glass articles; but obviously the broad principles of my process are applicable to the manufacture of nearly if not quite all articles which involve manipulation into finished form either by air or other pressure.

While I have shown a form of apparatus which I have successfully used, my process is of course not limited to this apparatus, but is capable of being practiced with any suitable means which shall reduce the glass to a fluid condition and which shall enable the operator to cause the glass to flow into the molds directly from the tank. So, also, the forms of molds shown are merely suggestive, as any form of press-mold or other mold which will permit of the described operations may be used.

I claim—

1. The process of manufacturing glass articles which comprises casting fluid glass in the presence of a high temperature, whereby the metal is maintained in a sufficiently fluid condition, and pressing the glass into finished form at a lower temperature.

2. The process of manufacturing glass articles which comprises casting fluid glass into incomplete form, in the presence of a high temperature, whereby the metal is maintained in a sufficiently fluid condition, removing the glass to a lower temperature and then manipulating the glass to finished form.

3. The process of manufacturing glass articles, which comprises flowing fluid glass in separate and controllable quantities into a highly-heated zone in which the metal is maintained in a sufficiently fluid condition, removing the quantities of glass, thus separated, into a lower temperature, and then manipulating the same to finished form.

4. The process of continuously manufacturing glass articles which comprises continuously feeding the batch to a zone of reduction, reducing the batch, causing the resultant metal to flow to a refining zone, fining the metal, then casting the metal in controllable quantities in the presence of a high temperature, whereby the metal is maintained in a sufficiently fluid condition, removing the metal so cast to a lower temperature, and then manipulating the glass to the required form.

SOLON O. RICHARDSON, Jr.

Witnesses:
C. C. OSWALD,
CHAS. G. ROBB.